United States Patent
Park et al.

(10) Patent No.: US 10,974,285 B2
(45) Date of Patent: Apr. 13, 2021

(54) DEVICE COMPRISING CLEANING ROLL AND FOR CLEANING PROTECTIVE FILM FOR PREPARING BATTERY CELL

(71) Applicant: LG CHEM, LTD., Seoul (KR)

(72) Inventors: Sang Youn Park, Seoul (KR); Jin Hak Kong, Seoul (KR); Kyu Hyun Choi, Yongin-si (KR)

(73) Assignee: LG CHEM, LTD., Seoul (KR)

( * ) Notice: Subject to any disclaimer, the term of this patent is extended or adjusted under 35 U.S.C. 154(b) by 294 days.

(21) Appl. No.: 16/066,957

(22) PCT Filed: Nov. 29, 2017

(86) PCT No.: PCT/KR2017/013771
§ 371 (c)(1),
(2) Date: Jun. 28, 2018

(87) PCT Pub. No.: WO2018/101725
PCT Pub. Date: Jun. 7, 2018

(65) Prior Publication Data
US 2019/0001376 A1    Jan. 3, 2019

(30) Foreign Application Priority Data

Nov. 30, 2016  (KR) .................. 10-2016-0161266
Nov. 28, 2017  (KR) .................. 10-2017-0160256

(51) Int. Cl.
*B08B 1/04*    (2006.01)
*B08B 1/02*    (2006.01)
(Continued)

(52) U.S. Cl.
CPC .................. *B08B 1/04* (2013.01); *B08B 1/02* (2013.01); *B08B 5/026* (2013.01); *B08B 7/0028* (2013.01);
(Continued)

(58) Field of Classification Search
CPC ......... H01M 10/0468; H01M 10/0585; H01M 10/052; H01M 10/04; B08B 1/02;
(Continued)

(56) References Cited

U.S. PATENT DOCUMENTS 5,813,073 A * 9/1998 Korbonski ................ B08B 1/02
15/102
5,980,646 A * 11/1999 DeRosa .................... B08B 1/02
134/21
(Continued)

FOREIGN PATENT DOCUMENTS

EP    2050515 A1    4/2009
JP    8-47674 A    2/1996
(Continued)

OTHER PUBLICATIONS

Machine Translation of JP 08-47674 to Nishiwaki, Feb. 1996. (Year: 1996).*

(Continued)

*Primary Examiner* — Benjamin L Osterhout
(74) *Attorney, Agent, or Firm* — Birch, Stewart, Kolasch & Birch, LLP

(57) ABSTRACT

The present disclosure provides a device for cleaning a protective film to be attached to an outer surface of a laminate during a lamination process of heating and pressing the laminate of electrodes and a separator to produce an electrode assembly of a battery cell, including a feed roll configured to supply the protective film, at least one guide roll configured to guide a progress of the protective film supplied from the feed roll, a cleaning roll located between the feed roll and a winding roll and configured to remove foreign substances remaining on the protective film supplied from the feed roll, and the winding roll configured to wind the protective film from which foreign substances have been removed by the cleaning roll, wherein a nano thin film is (Continued)

formed on an outer surface of the cleaning roll to adsorb and remove the foreign substances remaining on the protective film.

13 Claims, 5 Drawing Sheets

(51) Int. Cl.
*H01M 10/04* (2006.01)
*H01M 10/0585* (2010.01)
*H01M 10/052* (2010.01)
*B65H 37/00* (2006.01)
*B65H 18/00* (2006.01)
*B65H 20/02* (2006.01)
*B08B 5/02* (2006.01)
*B08B 7/00* (2006.01)

(52) U.S. Cl.
CPC ............ *B65H 18/00* (2013.01); *B65H 20/02* (2013.01); *B65H 37/00* (2013.01); *H01M 10/04* (2013.01); *H01M 10/0468* (2013.01); *H01M 10/052* (2013.01); *H01M 10/0585* (2013.01)

(58) Field of Classification Search
CPC ......... B08B 7/0028; B08B 5/026; B08B 1/04; B65H 37/00; B65H 20/02; B65H 18/00; Y02E 60/10
See application file for complete search history.

(56) References Cited

U.S. PATENT DOCUMENTS

| | | | |
|---|---|---|---|
| 2002/0112300 A1* | 8/2002 | Muhr-Sweeney | ................................ H04N 1/00127 15/104.002 |
| 2003/0066543 A1 | 4/2003 | Muscato et al. | |
| 2010/0224230 A1* | 9/2010 | Luch | ................. H01L 31/02008 136/244 |
| 2010/0328676 A1 | 12/2010 | Wagner et al. | |
| 2013/0260211 A1 | 10/2013 | Min et al. | |
| 2014/0165314 A1 | 6/2014 | Tempany | |
| 2016/0129483 A1* | 5/2016 | Sung | ....................... B08B 1/007 134/6 |
| 2017/0120380 A1* | 5/2017 | Zhang | .................. B23K 26/703 |

FOREIGN PATENT DOCUMENTS

| | | |
|---|---|---|
| JP | 3005705 B2 | 2/2000 |
| JP | 2001-321732 A | 11/2001 |
| JP | 4443791 B2 | 3/2010 |
| JP | 2013-3436 A | 1/2013 |
| JP | 2013-118062 A | 6/2013 |
| JP | 2015-145683 A | 8/2015 |
| KR | 10-2004-0078791 A | 9/2004 |
| KR | 10-0910389 B1 | 8/2009 |
| KR | 10-2009-0128764 A | 12/2009 |
| KR | 10-1355834 B1 | 1/2014 |
| KR | 101-355834 B1 | 1/2014 |
| KR | 10-2015-0045231 A | 4/2015 |
| KR | 10-1548180 B1 | 9/2015 |
| KR | 10-2016-0072421 A | 6/2016 |
| WO | 2005009633 A1 | 2/2005 |
| WO | 2009116568 A1 | 9/2009 |

OTHER PUBLICATIONS

International Search Report issued in PCT/KR2017/013771 (PCT/ISA/210), dated Mar. 8, 2018.

* cited by examiner

DEVICE COMPRISING CLEANING ROLL AND FOR CLEANING PROTECTIVE FILM FOR PREPARING BATTERY CELL

TECHNICAL FIELD

The present disclosure relates to a device including a cleaning roll, and for cleaning a protective film for preparing a battery cell.

BACKGROUND ART

Rechargeable secondary batteries are attracting attention as a power source for devices which require high output and large capacity such as electric vehicles (EVs), hybrid EVs (HEVs), plug-in HEVs, and the like, which have been proposed as a solution to the problem of air pollution generated by conventional gasoline vehicles and diesel vehicles using fossil fuel.

As described above, as the devices in which a secondary battery is applied are being diversified, lithium secondary batteries have been diversified to provide the output and capacity suitable for the devices, and there is additionally a strong demand for the miniaturization of lithium secondary batteries.

A lithium secondary battery includes a battery case, and an electrode assembly and an electrolytic solution incorporated in the battery case. Lithium secondary batteries are classified into cylindrical batteries, prismatic batteries, and pouch-type batteries according to an outer shape of the battery case.

The electrode assembly includes a positive electrode, a negative electrode, and a separator interposed between the positive electrode and the negative electrode, and a plurality of positive electrodes and negative electrodes are alternately stacked.

In particular, the electrode assembly in which a plurality of positive electrodes, negative electrodes, and separators are stacked is subjected to a lamination process of bonding the positive electrodes, the negative electrodes, and the separators by heating and pressing.

While heating and pressing the electrode assembly, in order to prevent the outer surface of the electrode assembly from being damaged by a pressing plate, heating and pressing are performed in a state in which a protective film is attached to a portion where the electrode assembly faces the pressing plate.

In particular, since the protective film is only intended to protect the outer surface of the electrode assembly during the heating and pressing processes, a production cost can be reduced by reusing the film after the lamination process.

However, a protective film which has already been used for the lamination process may inevitably be contaminated with microscopic foreign substances during the heating and pressing processes.

When the protective film contaminated by the foreign substances is attached to the outer surface of the electrode assembly again and the lamination process is performed, the electrode assembly may become contaminated with foreign substances.

If the electrode assembly is contaminated by foreign substances, a fatal problem which leads to reduced battery capacity may occur.

FIG. 1 is a schematic view briefly showing a winding device for a protective film used in a conventional lamination process.

Referring to FIG. 1, a protective film winding device 10 includes a feed roll 11, a guide roll 15 and a winding roll 17.

More specifically, as the feed roll 11 rotates, a protective film 12 is moved in one direction, and the protective film 12 is wound around the winding roll 17 by the rotation of the winding roll 17 corresponding to the rotation of the feed roll 11.

In particular, there is a problem in that, since the protective film 12 wound around the winding roll 17 becomes contaminated by foreign substances 19 during the lamination process, the protective film 12 is wound around the winding roll 17 in a foreign substance contaminated state.

Therefore, there is a high need for a technique for preventing the electrode assembly from being contaminated in which the protective film used in the lamination process is rewound in a clean state in which all foreign substances have been removed, even if the protective film is reused after being used once.

DISCLOSURE

Technical Problem

The present disclosure is provided to solve the above-described problems of the related art and technical problems which have been identified in the past.

The inventors of the present application have conducted intense research and various experiments and have confirmed that when a cleaning device for a protective film is formed with a specific structure, foreign substances remaining on the protective film can be adsorbed and removed, and ultimately it is possible to prevent deterioration of battery capacity and a battery cell defect beforehand, thereby attaining the present disclosure.

Technical Solution

The present disclosure provides a device for cleaning a protective film to be attached to an outer surface of a laminate during a lamination process of heating and pressing the laminate of electrodes and a separator to produce an electrode assembly for a battery cell, including: a feed roll configured to supply the protective film; at least one guide roll configured to guide a progress of the protective film supplied from the feed roll; a cleaning roll located between the feed roll and a winding roll and configured to remove foreign substances remaining on the protective film supplied from the feed roll; and the winding roll configured to wind the protective film from which foreign substances have been removed by the cleaning roll, wherein a nano thin film is formed on an outer surface of the cleaning roll to adsorb and remove the foreign substances remaining on the protective film.

In particular, the feed roll, the guide roll, the winding roll, and the cleaning roll may be positioned such that their rotation axes are parallel to each other.

Accordingly, the feed roll, the guide roll, the winding roll, and the cleaning roll may rotate in the same direction and with the same circumferential velocity.

In particular, as the winding roll rotates, the protective film supplied from the feed roll may be moved to the winding roll through the cleaning roll.

In other words, the feed roll configured to supply the protective film and the winding roll configured to wind the protective film may not be separately rotated by separate power sources, but may be formed so that the power source is connected only to a rotation axis of the winding roll.

Accordingly, as the winding roll rotates to wind the protective film, the protective film may be transported while the feed roll configured to supply the protective film is rotated.

As described above, by connecting the power source only to the rotation axis of the winding roll, the protective film supplied from the feed roll may be transported in a taut state having a predetermined tensile force, thereby increasing a foreign substance cleaning efficiency of the cleaning roll.

A sensor positioned between the cleaning roll and the winding roll with respect to a movement direction of the protective film and configured to check whether or not the foreign substances on the protective film have been removed may be further included.

In particular, the sensor may include a light source part configured to irradiate, onto the protective film, light transmitted through the protective film; and a monitor part configured to sense the light transmitted through the protective film. The light source part and the monitor part may be positioned in a straight line with the protective film interposed therebetween and the sensor may be configured to visually check through the monitor part whether or not the foreign substances on the protective film have been removed.

As described above, when the sensor is used for confirming the removal of foreign substances, the protective film may be formed of a light-transmitting material.

Also, an intensity of the light emitted from the light source part may be adjusted depending on the material of the protective film.

The monitor part may be configured to sense the light transmitted through the protective film, so that an operator may visually check through the monitor part whether or not the foreign substances on the protective film have been removed.

Specifically, the light irradiated from the light source part cannot pass through the foreign substances. Therefore, when the foreign substances have not been removed by the cleaning roll, the foreign substances may be seen as a shadow or a dot in the monitor part.

Further, when a large number of foreign substances have not been removed, the brightness of the protective film viewed from the monitor part may be significantly reduced. Thus, when the brightness of the protective film is lower than a predetermined brightness or when many shadows or dots are seen, an operator may stop the movement of the protective film.

In addition, the sensor may further include a light intensity sensing part configured to measure a light intensity of the light transmitted through the protective film; and operations of the winding roll and the feel roll may be stopped when the light intensity measured by the light intensity sensing part is less than a predetermined value.

As described above, in addition to what the operator sees on the monitor part, the sensor may include the light intensity sensing part which, by using the property of the light emitted from the light source part of not passing through the foreign substances, automatically measures the light intensity of the light transmitted through the protective film.

In particular, a reference value of the light intensity for adjustment of the operations of the winding roll and the feed roll by the light intensity sensing part may be adjusted according to the operator's choice.

When the light intensity measured by the light intensity sensing part is less than a predetermined value, the operations of the winding roll and the feed roll stop, which means that there is a foreign substance not yet removed on the protective film, and therefore the foreign substance needs to be removed.

In one specific example, the cleaning roll may be formed to be movable in a movement direction of the protective film and an opposite direction thereof, and when it is confirmed by the sensor that foreign substances have not been removed, the cleaning roll may move in the movement direction of the protective film and the opposite direction thereof, and the foreign substances on the protective film may be removed.

Only the cleaning roll may rotate and move in the movement direction of the protective film to remove the foreign substances which are not removed by the cleaning roll in a state in which the operations of the winding roll and the feed roll are stopped, that is, in a state in which the movement of the protective film is stopped.

As described above, as the cleaning roll rotates and moves, the remaining foreign substances on the protective film may be removed, and the cleaning roll may be moved back into place by being moved back and forth.

In particular, a nano thin film formed on an outer surface of the cleaning roll may be formed such that particles having a particle size of 0.5 μm or less are adsorbed.

In order to remove foreign substances having a particle size of 2 μm or more, an air compressor may be further included to spray air on both sides of the protective film and remove large particles of the foreign substances.

In particular, the movement direction of the protective film may be changed to be vertical by the guide roll, and by changing the movement direction of the protective film, the large particles of the foreign substances may be naturally removed when the movement direction of the protective film is changed.

Also, according to the manufacturer's choice, the guide roll may be a plurality of guide rolls, and sections in which the movement direction of the protective film is an upward vertical direction or a downward vertical direction may be formed.

In another specific example, power sources may be respectively connected to the feed roll configured to supply the protective film and the winding roll configured to wind the protective film.

Specifically, the power source connected to the feed roll may be formed to rotate the feed roll in a direction opposite to a rotating direction of the winding roll, and when the feed roll is reversed, the protective film may be transported to the feed roll again.

In particular, when the sensor confirms that the foreign substances have not been removed, the protective film may be moved to the winding roll as the winding roll rotates, and then the protective film wound on the winding roll may be unwound and moved to the feed roll as the feed roll rotates in a reverse direction.

Thus, by connecting the power sources to the winding roll and feed roll, respectively, the protective film may be moved in both directions so that a portion where the foreign substances on the protective film have not been removed may be repeatedly passed through the cleaning roll.

In still another specific example, the cleaning roll may include a first cleaning roll and a second cleaning roll; nano thin films of the first cleaning roll and the second cleaning roll may be formed to adsorb foreign particles having different sizes, and the first cleaning roll may be formed to adsorb larger foreign particles than the second cleaning roll; and the first cleaning roll and the second cleaning roll may be arranged in sequence on the basis of a movement direction of the protective film moving from the feed roll to the winding roll.

In particular, the nano thin film formed on the first cleaning roll may be formed so that particles having a size of 1 μm to 2 μm are adsorbed, and the nano thin film formed on the second cleaning roll may be formed so that particles having a size of less than 0.5 μm are adsorbed.

As described above, by providing a plurality of cleaning rolls and varying the size of the foreign particles adsorbed by each of the cleaning rolls, it is possible to increase an efficiency of removing foreign substances remaining on the protective film, and the number of the cleaning rolls and the size of the adsorbed foreign particles may be changed according to the manufacturer's choice.

The cleaning roll may include a pair of rolls, and the rolls may be formed in a straight line in a vertical direction with the protective film interposed therebetween. The foreign substances remaining on both sides of the protective film may be removed while the protective film passes between the pair of rolls. Thus, by cleaning both sides of the protective film, ultimately, productivity of an electrode assembly may be increased.

Advantageous Effects

As described above, a device for cleaning a protective film and according to the present disclosure includes a cleaning roll having a nano thin film on its outer surface, thereby effectively removing foreign substances on the protective film contaminated in a lamination process. Accordingly, the protective film can be reused and a production cost can be reduced.

Further, in addition to the cleaning roll, by providing a sensor configured to check foreign substances remaining on the protective film, it is possible to check with the sensor whether or not the foreign substances have been removed by the cleaning roll, and ultimately, a decrease in productivity and a battery cell defect can be prevented in advance.

DETAILED DESCRIPTION OF THE PREFERRED EMBODIMENTS

Hereinafter, embodiments of the present disclosure will be described with reference to the accompanying drawings. However, the description provided herein is for better understanding of the present disclosure, and the scope of the present disclosure is not limited thereto.

Figure 1:
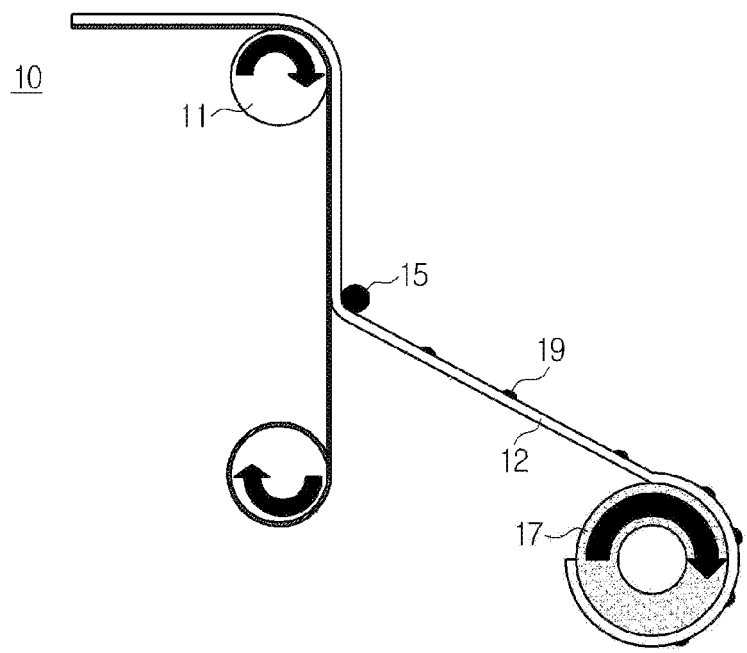
FIG. 1 is a schematic view briefly showing a winding device for a protective film used in a conventional lamination process.
Figure 2:
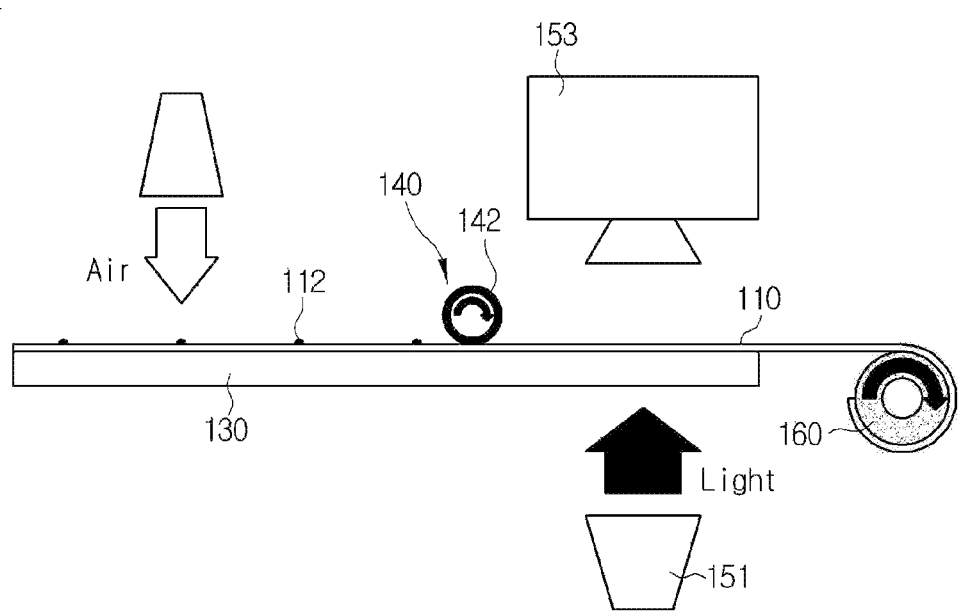
FIG. 2 is a schematic view briefly showing a process of cleaning a protective film using a protective film cleaning device according to an exemplary embodiment of the present disclosure.

FIG. 2 is a schematic view briefly showing a process of cleaning a protective film using a protective film cleaning device according to an exemplary embodiment of the present disclosure.

Referring to FIG. 2, a cleaning device for a protective film 100 may include an air compressor 120, a feed roll (not shown), a cleaning roll 140, a winding roll 160, a support frame 130, and sensors 151 and 153.

The air compressor 120 may strongly jet air to the protective film 110 according to the rotation of the winding roll 160 when the protective film 110 moves so that foreign substances 112 remaining on the protective film 110 may be primarily removed.

In particular, the protective film 110 may be formed to move on the support frame 130, and the cleaning roll 140 may be rotatably fixed to an upper part of the support frame 130.

The sensors 151 and 153 may be positioned between the cleaning roll 140 and the winding roll 160, and the sensor may include a light source part 151 and a monitor part 153.

In particular, the light source part 151 of the sensor may irradiate, toward the protective film 110, light transmitted through the protective film 110, and the monitor part 153 may sense the light transmitted through the protective film 110.

In addition, in order to sense the light transmitted through the protective film 110, the monitor part 153 may be positioned in a straight line in a direction facing the light source part 151 with the protective film 110 interposed therebetween.

In particular, the monitor part 153 may be formed such that an operator can visually check the light transmitted through the protective film 110, and an operation of the winding roll 160 may be controlled by the operator.

Accordingly, when the operator confirms through the monitor part 153 that the foreign substances on the protective film 110 have not been removed by the cleaning roll 140, the operator may stop the rotation of the winding roll 160 to remove the foreign substances on the protective film 110.

The sensor may further include a light intensity sensing part (not shown) configured to measure light intensity of the light transmitted through the protective film 110.

Specifically, the light intensity sensing part may sense the light intensity using a principle of light intensity decreasing when a large amount of particles of the foreign substances 112 remain on the protective film 110, and transmittance of the light emitted from the light source part 151 through the protective film 151 is reduced.

In particular, when the light intensity is lower than a predetermined value, the rotation of the winding roll 160 may be automatically stopped by the light intensity sensing part which measures the light intensity of the light transmitted through the protective film 110, so that the efficiency of a cleaning process of the protective film 110 may be increased.

Figure 3:
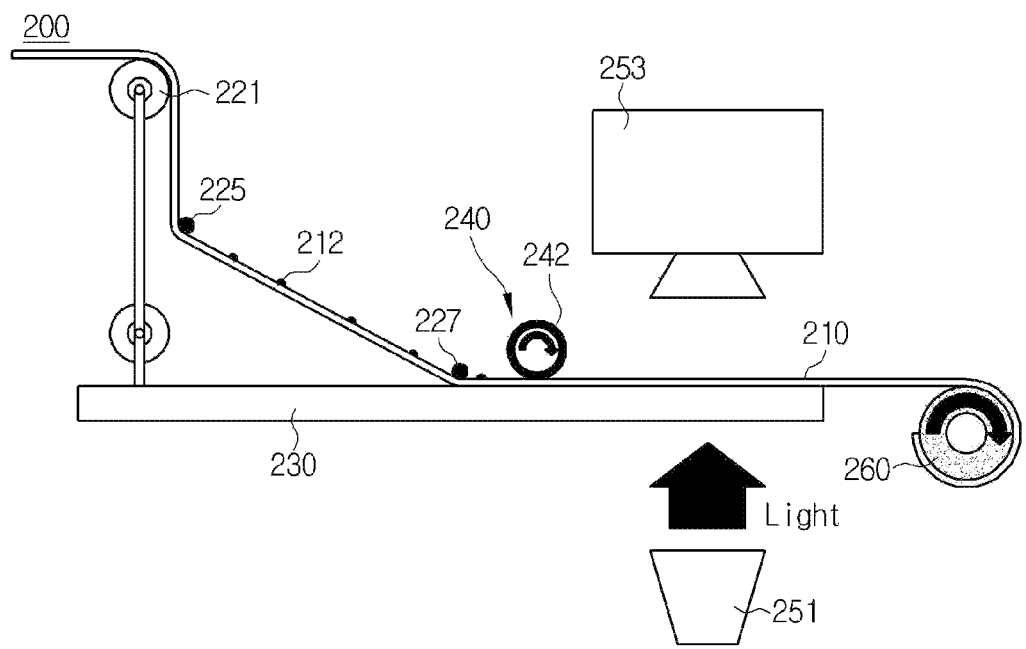
FIG. 3 is a schematic view briefly showing a process of cleaning a protective film using a protective film cleaning device according to another exemplary embodiment of the present disclosure.

FIG. 3 is a schematic view briefly showing a process of cleaning a protective film using a protective film cleaning device according to another exemplary embodiment of the present disclosure.

Referring to FIG. 3, a cleaning device for a protective film 200 includes a feed roll 221, guide rolls 225 and 227, a cleaning roll 240 having a nano thin film 242 formed on an outer surface thereof, a winding roll 260, a support frame 230, and sensors 251 and 253.

The feed roll 221 of FIG. 3 may have a type which supplies the protective film 210 from one side without the protective film 210 being wound, but is not limited thereto, and the protective film 210 may be wound around the feed roll 221.

A lower side of the feed roll 221 may be connected to the guide rolls 225 and 227 in order to change a movement direction of the protective film 210 to be vertical.

As the guide rolls 225 and 227 are formed as described above, the movement direction of the protective film 210 may be changed. While being changed the movement direction of the protective film 210, large particles of the foreign substances may be unforcedly removed.

In order to move the protective film 210 along an upper surface of the support frame 230, the movement direction of the protective film 210 must be changed again toward the support frame 230, and the guide roll 227 may thus be formed.

Figure 4:
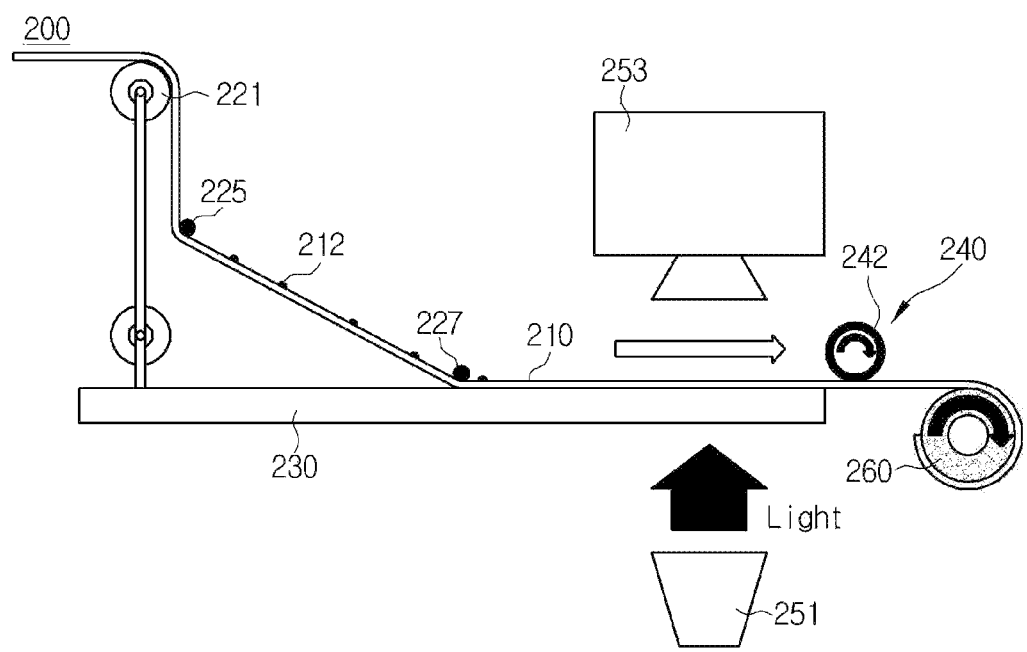
FIG. 4 is a schematic view briefly showing a process of stopping a movement of a protective film in its state in FIG. 3 and then removing foreign substances on the protective film as a cleaning roll moves.

FIG. 4 is a schematic view briefly showing a process of stopping a movement of a protective film in the state in FIG. 3 and then removing foreign substances on the protective film as a cleaning roll moves.

Referring to FIGS. 3 and 4, when the operator confirms that the foreign substances on the protective film 210 have not been removed by the cleaning roll 240 through the monitor part 253 and stops the rotation of the winding roll 260, the foreign substances remaining on the protective film 210 may be removed by being adsorbed by the nano thin film 242 of the cleaning roll 240.

In particular, the feed roll 221 or the winding roll 260 may not rotate in a direction opposite to a direction in which the protective film 210 is wound by the winding roll 260, which is an original movement direction of the protective film 210. The rotation of the feed roll 221 and the winding roll 260 may be stopped and only the cleaning roll 240 may be reciprocally rotated so that the foreign substances remaining on the protective film 210 may be adsorbed.

FIG. 3 shows the cleaning roll 240 in its regular position, and FIG. 4 shows the cleaning roll 240 rotating and moving along the upper surface of the protective film 210, and the cleaning roll 240 moves again to the regular position shown in FIG. 3.

The number of times the cleaning roll 240 reciprocally rotates and moves is freely controllable in accordance with the operator's choice or a removal state of the foreign substances.

Figure 5:
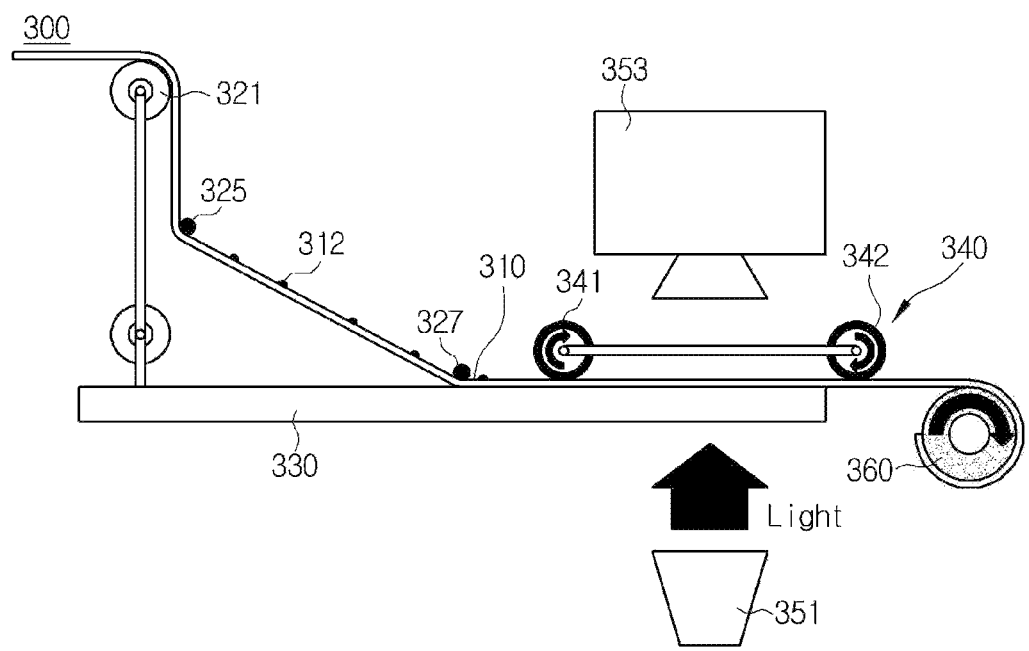
FIG. 5 is a schematic view briefly showing a process of cleaning a protective film using a protective film cleaning device according to another exemplary embodiment of the present disclosure.

FIG. 5 is a schematic view briefly showing a process of cleaning a protective film using a protective film cleaning device according to another exemplary embodiment of the present disclosure.

Referring to FIG. 5, a cleaning device for a protective film 300 may be constructed in the same manner as in the above-described embodiments, with exception for the cleaning roll 340.

A plurality of cleaning rolls 340 may be fixed to a support frame 330, and while rotating in a fixed state, foreign substances may be adsorbed by nano thin films on outer surfaces of cleaning rolls 341 and 342.

In particular, different nano thin films are formed on the cleaning rolls 341 and 342 so that foreign substances having different sizes are adsorbed.

Specifically, a first cleaning roll 341 and a second cleaning roll 342 are disposed in sequence with respect to the movement direction of of the protective film 310 moving from a feed roll 321 to a winding roll 360.

In particular, a size of the foreign substances adsorbed on the nano thin film of the first cleaning roll 341 may be larger than a size of the foreign substances adsorbed on the nano thin film of the second cleaning roll 342.

As described above, by providing the first cleaning roll 341 and the second cleaning roll 342 having nano thin films for adsorbing foreign particles of different sizes, coarse and large particles are first adsorbed by the first cleaning roll 341 and smaller particles are adsorbed by the second cleaning roll 342, thereby increasing cleaning efficiency.

Figure 6:
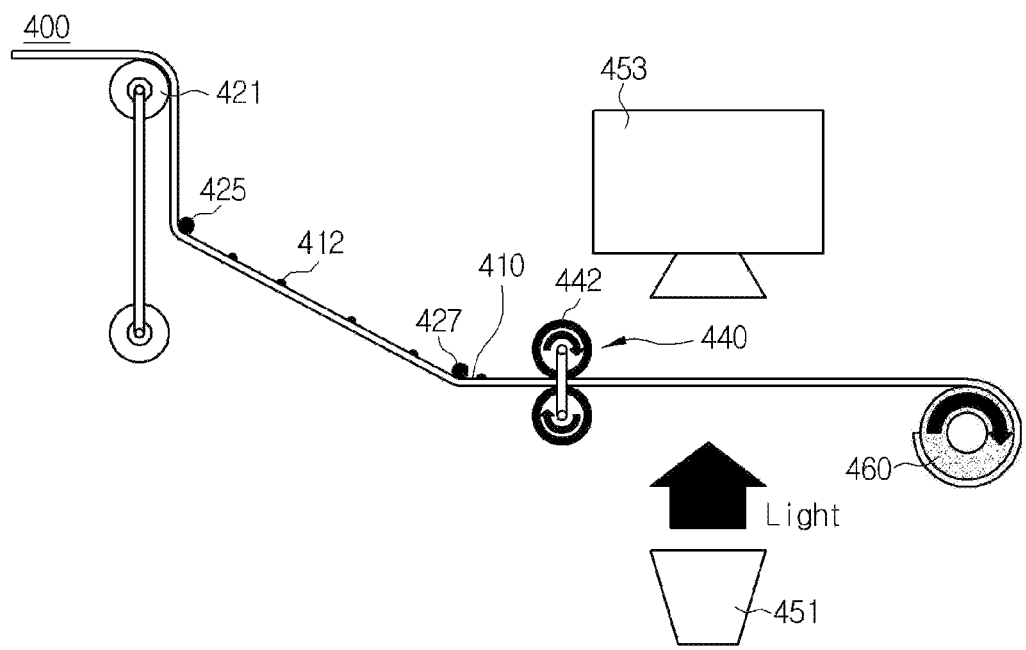
FIG. 6 is a schematic view briefly showing a process of cleaning a protective film using a protective film cleaning device according to another exemplary embodiment of the present disclosure.

FIG. 6 is a schematic view briefly showing a process of cleaning a protective film using a protective film cleaning device according to another exemplary embodiment of the present disclosure.

Referring to FIG. 6, cleaning rolls 440 may be formed in a straight line in a vertical direction with a protective film 410 interposed therebetween. When the protective film 410 passes between the pair of rolls 440, foreign substances remaining on both surfaces of the protective film 410 may be removed.

Since the foreign substances remaining on both surfaces of the protective film 410 are removed using the pair of cleaning rolls 440, time required for the cleaning process of the protective film 410 may be shortened.

It should be understood by those skilled in the art that various changes may be made without departing from the spirit and scope of the present disclosure.

The invention claimed is:

1. A device for cleaning a protective film to be attached to an outer surface of a laminate during a lamination process of heating and pressing the laminate of electrodes and a separator to produce an electrode assembly for a battery cell, the device comprising:
   a feed roll configured to supply the protective film;
   at least one guide roll configured to guide a progress of the protective film supplied from the feed roll;
   a cleaning roll located between the feed roll and a winding roll and configured to remove foreign substances remaining on the protective film supplied from the feed roll; and
   the winding roll configured to wind the protective film from which foreign substances have been removed by the cleaning roll,
   wherein an outer surface of the cleaning roll is configured to have a nano thin film thereon, and the nano thin film is configured to adsorb and remove the foreign substances in the form of particles having a particle size of 2 μm or less remaining on the protective film.

2. The device of claim 1, wherein the feed roll, the guide roll, the winding roll, and the cleaning roll are positioned such that their rotation axes are parallel to each other.

3. The device of claim 1, wherein as the winding roll rotates, the protective film supplied from the feed roll is moved to the winding roll through the cleaning roll.

4. The device of claim 1, further comprising a sensor positioned between the cleaning roll and the winding roll with respect to a movement direction of the protective film and configured to check whether or not the foreign substances on the protective film have been removed.

5. The device of claim 4, wherein the sensor comprises
a light source part configured to irradiate, onto the protective film, light transmitted through the protective film; and
a monitor part configured to sense the light transmitted through the protective film,
wherein the light source part and the monitor part are positioned in a straight line with the protective film interposed therebetween and the sensor is configured to visually check through the monitor part whether or not the foreign substances on the protective film have been removed.

6. The device of claim 5, wherein the sensor further includes a light intensity sensing part configured to measure a light intensity of the light transmitted through the protective film, and
operations of the winding roll and the feed roll are stopped when the light intensity measured by the light intensity sensing part is less than a predetermined value.

7. The device of claim 6, wherein the cleaning roll is configured to be movable in a movement direction of the protective film and an opposite direction thereof, and when it is confirmed by the sensor that foreign substances have not been removed, the cleaning roll moves in the movement direction of the protective film and the opposite direction thereof to remove the foreign substances on the protective film.

8. The device of claim 4, wherein, when the sensor confirms that the foreign substances have not been removed, the protective film is moved to the winding roll as the winding roll rotates, and then the protective film wound on the winding roll is unwound and moved to the feed roll as the feed roll rotates in a reverse direction.

9. The device of claim 1, wherein the nano thin film is configured such that the particles having the particle size of h im or less are adsorbed.

10. The device of claim 1, wherein the cleaning roll includes a first cleaning roll and a second cleaning roll;
nano thin films of the first cleaning roll and the second cleaning roll are configured to adsorb foreign particles having different sizes, and the first cleaning roll is configured to adsorb larger foreign particles than the second cleaning roll; and
the first cleaning roll and the second cleaning roll are arranged in sequence on the basis of a movement direction of the protective film moving from the feed roll to the winding roll.

11. The device of claim 10, wherein the nano thin film on the first cleaning roll is configured so that the particles having the size of 1 µm to 2 µm are adsorbed, and the nano thin film on the second cleaning roll is configured so that the particles having the size of less than 0.5 µm are adsorbed.

12. The device of claim 1, wherein the cleaning roll includes a pair of rolls, and the rolls are configured in a straight line in a vertical direction with the protective film interposed therebetween, and the foreign substances remaining on both sides of the protective film are removed while the protective film passes between the pair of rolls.

13. The device of claim 1, wherein the cleaning roller rotates in a winding direction of the winding roll.

* * * * *